(12) United States Patent
Ikeuchi et al.

(10) Patent No.: US 6,397,144 B2
(45) Date of Patent: May 28, 2002

(54) ON-VEHICLE INFORMATION PROCESSOR WITH MAP DATA AND MAP DATA MANAGEMENT

(75) Inventors: Tomoya Ikeuchi; Masaharu Umezu, both of Tokyo; Shoichiro Takenaka, Hyogo; Yoshihisa Nakao, Hyogo; Satoshi Maegawa, Hyogo; Makoto Mikuriya; Mitsuo Shimotani, both of Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 50 days.

(21) Appl. No.: 09/725,208

(22) Filed: Nov. 29, 2000

(30) Foreign Application Priority Data

Nov. 30, 1999 (JP) .......................................... 11-341031

(51) Int. Cl.[7] .............................................. G01C 21/32
(52) U.S. Cl. ........................ 701/208; 701/206; 701/207; 340/995
(58) Field of Search ................................... 701/206, 207, 701/208, 209, 210, 211; 340/995

(56) References Cited

U.S. PATENT DOCUMENTS

| 6,047,280 A | 4/2000 | Ashby et al. ................... 707/2 |
| 6,308,177 B1 | * 10/2001 | Israni et al. ................ 340/990 |
| 2001/0002457 A1 | 5/2001 | Umezu et al. .............. 701/208 |

FOREIGN PATENT DOCUMENTS

| JP | 10-253367 | 9/1998 |
| JP | 411311941 | * 11/1999 |

* cited by examiner

Primary Examiner—William A. Cuchlinski, Jr.
Assistant Examiner—Marthe Y. Marc-Coleman
(74) Attorney, Agent, or Firm—Leydig, Voit & Mayer, Ltd.

(57) ABSTRACT

An on-vehicle information processor is configured such that, when there is a request for access from application units to the same map data stored in a data management unit, a request analyzing unit maintains the map data unlocked so that the applications can access the map data.

7 Claims, 9 Drawing Sheets

ON-VEHICLE INFORMATION PROCESSOR WITH MAP DATA AND MAP DATA MANAGEMENT

BACKGROUND OF THE INVENTION

1. Field of the Invention

The present invention generally relates to on-vehicle information processors for providing map information based on map data and, more particularly, to an on-vehicle information processor in which a large volume of map data and associated map management data is managed efficiently.

2. Description of the Related Art

FIG. 10 is a block diagram showing a construction of an on-vehicle information processor disclosed in Japanese Laid-Open Patent Application No. 10-253367. Referring to FIG. 10, the on-vehicle information processor comprises applications 101–103 for providing services to a user by processing map data and the like; an operating system 104 for providing basic functions related to a recording medium 105 for storing map data and the like and a memory 106 for temporarily storing map data when the application is executed; a cache 111 for caching the map data and the like; and a device driver 121 for directly controlling the recording medium 105. The applications 101–103 and the operating system 104 are stored in, for example, a read-only memory (ROM) and executed by a microprocessor after being developed in a random access memory (RAM) or the like.

A description will now be given of the operation according to the related art.

FIG. 11 shows an example of how a cache is used in the related-art on-vehicle information processor.

When any of the applications 101–103 reads out the map data from the recording medium 105 via the operating system 104, the map data is stored in the cache 111 and retained therein according to a predetermined caching system. When the cache 111 becomes full, the data is discarded appropriately. When any of the applications 101–103 accesses the data stored in the cache 111, accessed data, for example, data items 111-1–111-3, are locked so that the other applications are prevented from accessing the data 111-1–111-3. In this way, the integrity of the cache 111 is maintained.

The applications 101–103 provide to the user based on the map data thus read out. For example, the application displays a road map on a display.

As described, in the related-art on-vehicle information processor, the data is locked so that applications other than the initially accessing application are prevented from accessing that data. Therefore, accessing from a plurality of applications the same data in the cache is not permitted. Accordingly, improvement in the processing speed cannot be hoped for.

SUMMARY OF THE INVENTION

Accordingly, a general object of the present invention is to provide an on-vehicle information processor in which the aforementioned drawback is eliminated.

Another and more specific object is to provide an on-vehicle information processor in which the processing speed is improved by allowing a plurality of applications to access the same map data temporarily stored in a map data cache.

Still another object of the present invention is to provide an on-vehicle information processor in which map data and map management data read out by a data reading unit are managed independently such that the map data and the map management data are read out from a data managing unit when required, so that the efficiency in processing an application is improved.

The aforementioned objects can be achieved by an on-vehicle information processor for providing map information based on map data, comprising: application processing means for providing predetermined map information based on map data and map management data; a data reading unit for reading the map data and the map management data from a recording medium; a data management unit for managing the map data and the map management data independently; and a request analyzing unit for responding to a request from the application processing means to permit access from the application processing means to the map data and the map management data managed by the data management unit.

The data management unit may acquire the map management data provided initially to the application means, so as to manage the acquired map management data; the request analyzing unit reads out the map management data from the recording medium via the data reading unit so as to supply the map management data thus read out to the application means, when the map management data is initially required by the application means; and the request analyzing unit may supply the map management data managed by the data management unit to the application means when the map management data is subsequently required by the application means.

The data management unit may be provided with a map data cache and a control unit for controlling the map data cache.

The control unit in the data management unit may control the total size of map data stored in the map data cache to be smaller than a predetermined upper limit.

The request analyzing unit may grant access from a plurality of application means to the same map data stored in the map data cache.

The map data cache may store count information indicating a number of application means accessing a storage area storing the map data, and the control unit may determine the map data stored in the map data cache that should be discarded, based on the count information stored in the map data cache.

The map data cache may store information relating to chronological sequence of storage of the map data or information indicating time of access to the map data, and the control unit may determine the map data stored in the map data cache that should be discarded, based on the information stored in the map data cache.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS.

First Embodiment

Figure 1:
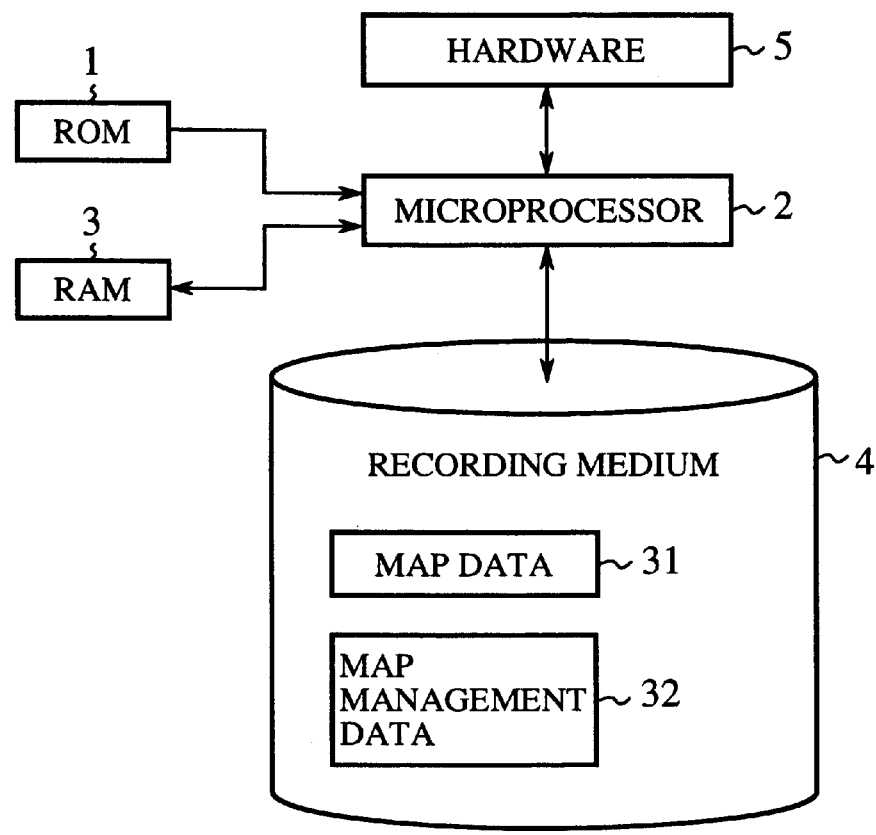
FIG. 1 is a block diagram showing a hardware construction of an on-vehicle information processor according to a first embodiment of the present invention.
Figure 2:
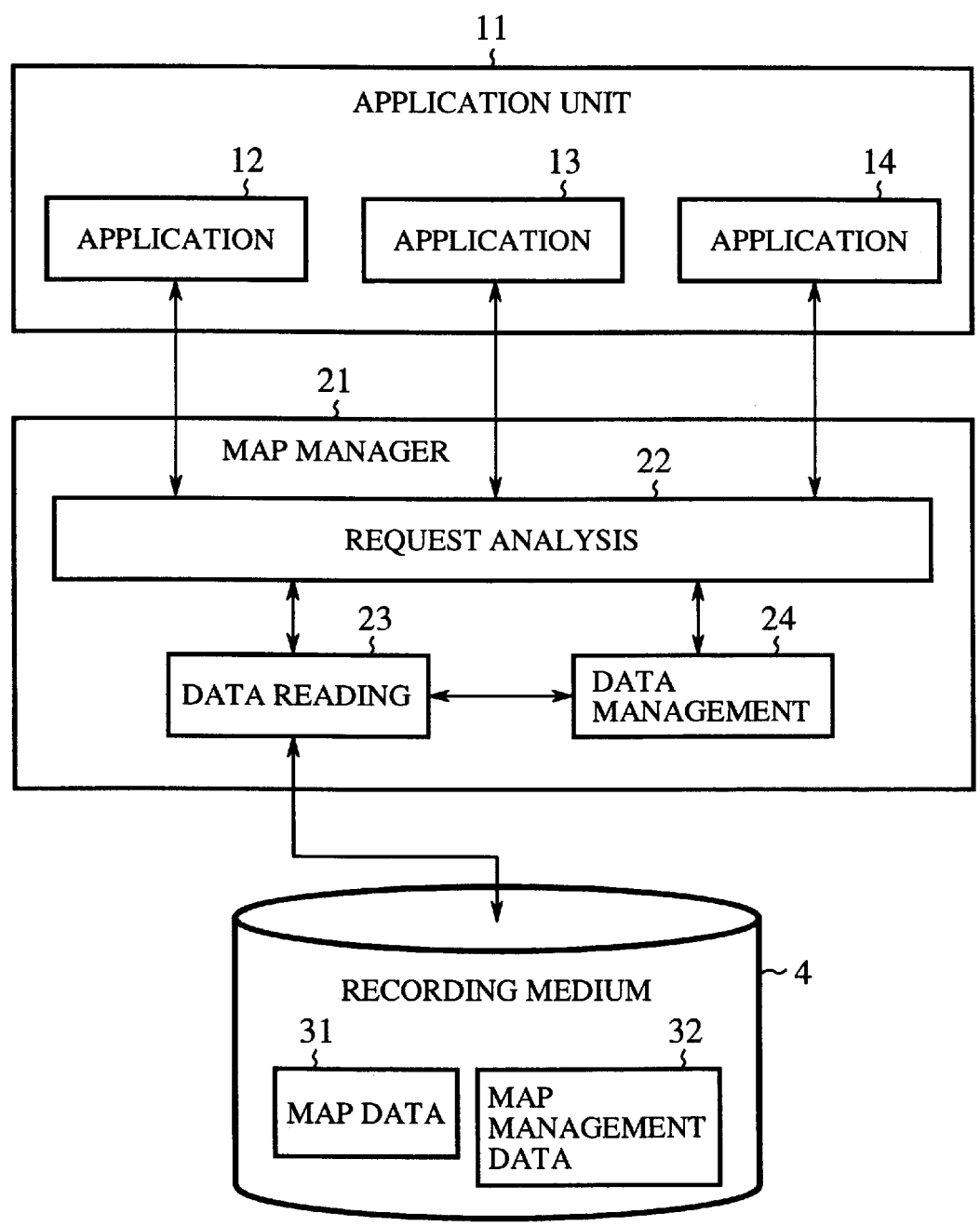
FIG. 2 is a block diagram showing a hierarchical construction of the on-vehicle information processor according to the first embodiment.
Figure 3:
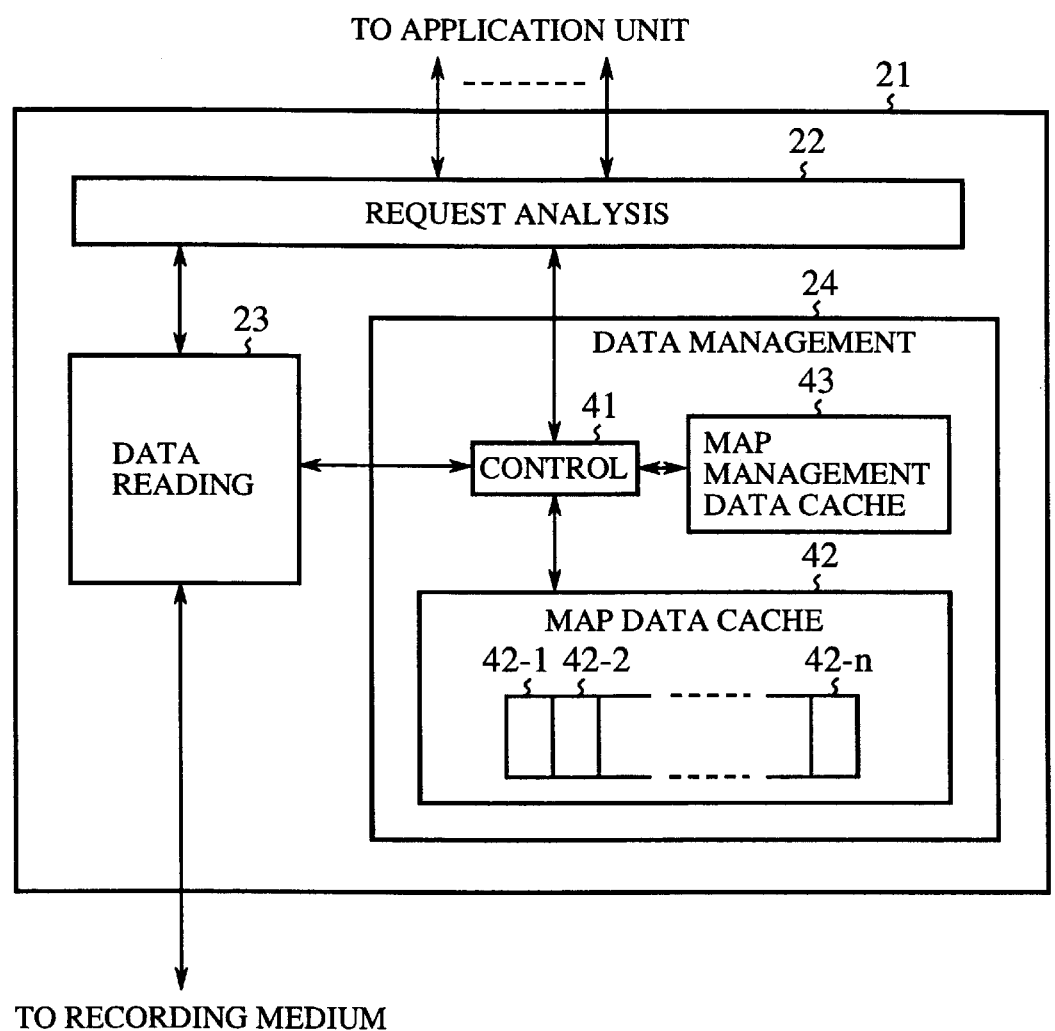
FIG. 3 is a block diagram showing a construction of a map manager.

FIG. 1 is a block diagram showing a construction of an on-vehicle information processor according to a first embodiment of the present invention. FIG. 2 is a block diagram showing a hierarchical construction of the on-vehicle information processor according to the first embodiment. FIG. 3 is a block diagram showing a map manger of FIG. 2.

Referring to FIG. 1, the on-vehicle information processor comprises: a read-only memory (ROM) 1 for storing programs such as applications that implement a navigation system, an operating system, device drivers and a map manager described later; a microprocessor 2 for controlling hardware by executing related processes in accordance with a program such as the operating system; a random access memory (RAM) 3 for temporarily storing programs being accessed and data associated therewith; a recording medium 4 for storing map data 31 including information relating to road links and nodes for respective areas of a predetermined size, map management data 32 including information related to the map data, such as the number of levels of scales and scale sizes at respective levels, the recording medium 4 being comprised of, for example, a digital versatile disk-ROM (DVD-ROM) and a device for driving the same; hardware 5 that implements a navigation system, including, for example, a vehicle speed sensor, a global positioning system (GPS), a display and a remote controller. In addition to the information related to the roads, the map data may include additional information related to buildings, stores and the like.

Referring to FIG. 2, the on-vehicle information processor further comprises: an application unit (application processing means) provided with a plurality of applications 12–14 that provide predetermined services related to map information based on the map data 31 and the map management data 32; a map manager 21 provided with the request analyzing unit 22, a data reading unit 23 and a data management unit 24. The map manager 21 is implemented as a part of the operating system or as the device driver. Information (not shown) is transferred between the applications 12–14 and the hardware 5 via the operating system and the device driver so that various services are provided to the user.

The request analyzing unit 22 of the map manager 21 permits access from the applications 12–14 to the map data 31 and the map management data 32 managed by the map management unit 24 in response to a request from the application means 12–14. The data reading unit 23 reads the map data 31 and the map management data 32 from the recording medium 4. The data management unit 24 independently manages the map data 31 and the map management data 32 read out by the data reading unit 23.

Referring to FIG. 3, the data management unit 24 comprises: a map data cache 42 having a total of n data storage areas 42-1–42-n; a control unit 41 for controlling the map data cache 42; and a map management data cache 43 for storing map management data. Each of the data storage areas 42-1–42-n, generically denoted as 42-i, stores map data for one geographical area. A predetermined area in the random access memory 3, accessible at a higher speed than the recording medium 4, is used as a cache.

A description will now be given of the operation according to the first embodiment.

Figure 5:
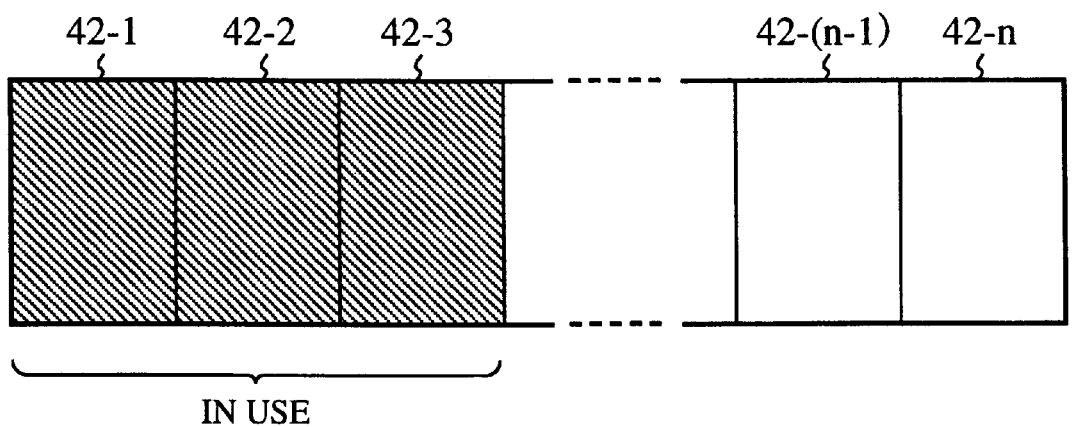
FIG. 5 is an example of how a map data cache is used.
Figure 4:
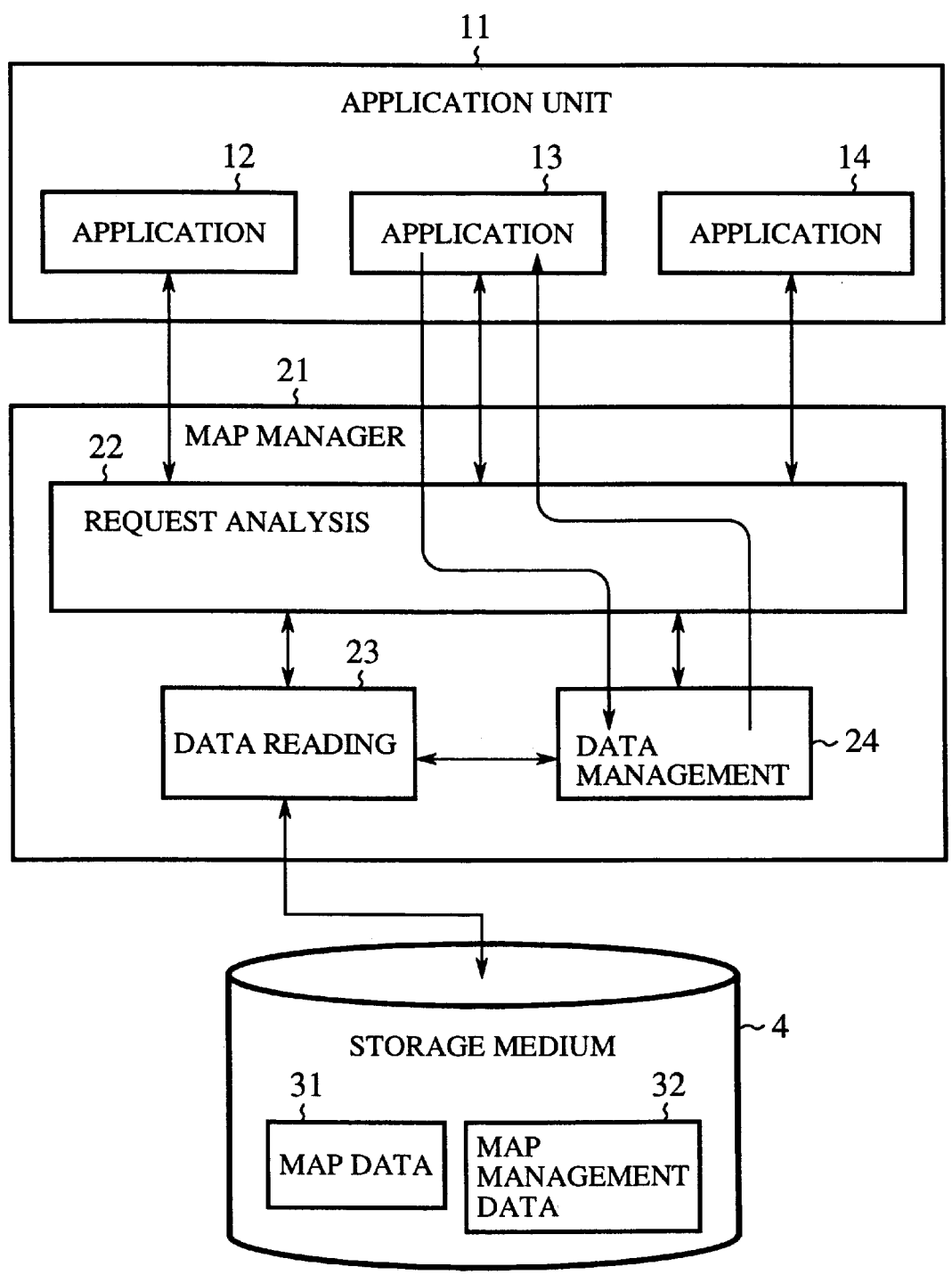
FIG. 4 shows an operation performed when map data is stored in a map data cache.

FIG. 4 shows an operation performed when the map data 31 is stored in the map data cache 42. FIG. 5 is an example of how the map data cache 42 is used according to the first embodiment.

The process involving the map management data will be described.

When any of the applications 12–14 is executed such that the map management data 32 is required, the application sends a request for access to the map management data 32 to the map manager 21. Since the map management data 32 is not managed by the data management unit 24, the request analyzing unit 22 controls the data reading unit 23 to read the map management data 32 from the recording medium 4 and supplies the data thus read out to the data management unit 24.

The map management data 32 supplied to the map management unit 24 is stored by the control unit 41 in the map management data cache 43. The request analyzing unit 22 reads out the map management data 32 from the data management unit 24 and supplies the data thus read out to the requesting application. The map management data 32 may also be read out by the data reading unit 23 and stored in the data management unit 24 when the information processor is started.

When any of the application means 12-14 sends a request for access to the map management data 32 to the map manager 21 subsequently, the request analyzing unit 22 of the map manager 21 reads out the map management data from the map management data cache 43 via the control unit 41 of the data management unit 24 and supply the data thus read out to the requesting application.

The requesting application provides services to the user, based on the map management data thus read out, the map data described later, information obtained from the hardware 5 such as a GPS receiver, and the like. Thus, navigation images are displayed and audio navigation is given.

A description will now be given of the process involving the map data.

When any of the applications 12–14 requires map data, the application sends a request for the map data 31 to the map manager 21. The request analyzing unit 22 determines whether the requested map data 31 is stored in the map data cache 42 of the data management unit 24. When it is determined that the map data 31 is not stored in the map data cache 42, the request analyzing unit 22 controls the data reading unit 23 to read out the map data 31 from the recording medium 4 and supplies the data thus read out to the data management unit 24.

The map data 31 supplied to the data management unit 24 is stored by the control unit 41 in the map data storage area 42-i constituting the map data cache 42. The request analyzing unit 22 reads out the map data from the data management unit 24 and supplies the map data to the requesting application.

When it is determined that the map data 31 is stored in the map data cache 42, the request analyzing unit 22 allows the control unit 41 to read out the map data 31 and supplies the data thus read out to the requesting application. The map data remains unlocked so that, where there is a request for access from another application, the request analyzing unit 22 permits the requesting application to access the unlocked data so that the requested data is provided to the requesting application. More specifically, as shown in FIG. 5, when the three data items stored in respective map data storage areas 42-1–42-3 are used by the applications 12–14, other applications can access any of the three map data items stored in the map data storage areas 42-1–42-3.

As described, according to the first embodiment, assuming that a map data item stored in the map data cache 42 is already accessed by a first application, access from a plurality of other applications including second, third . . . applications to the same data item is granted so that the processing speed is improved.

In further accordance with the first embodiment, the map data and the map management data read out from the data reading unit 23 are managed independently by the data management unit 24 and are read out by the data management unit 24 when required. With this, a large volume of map data and map management data can be managed efficiently, thus improving the efficiency in application processes.

Second Embodiment

Figure 6:
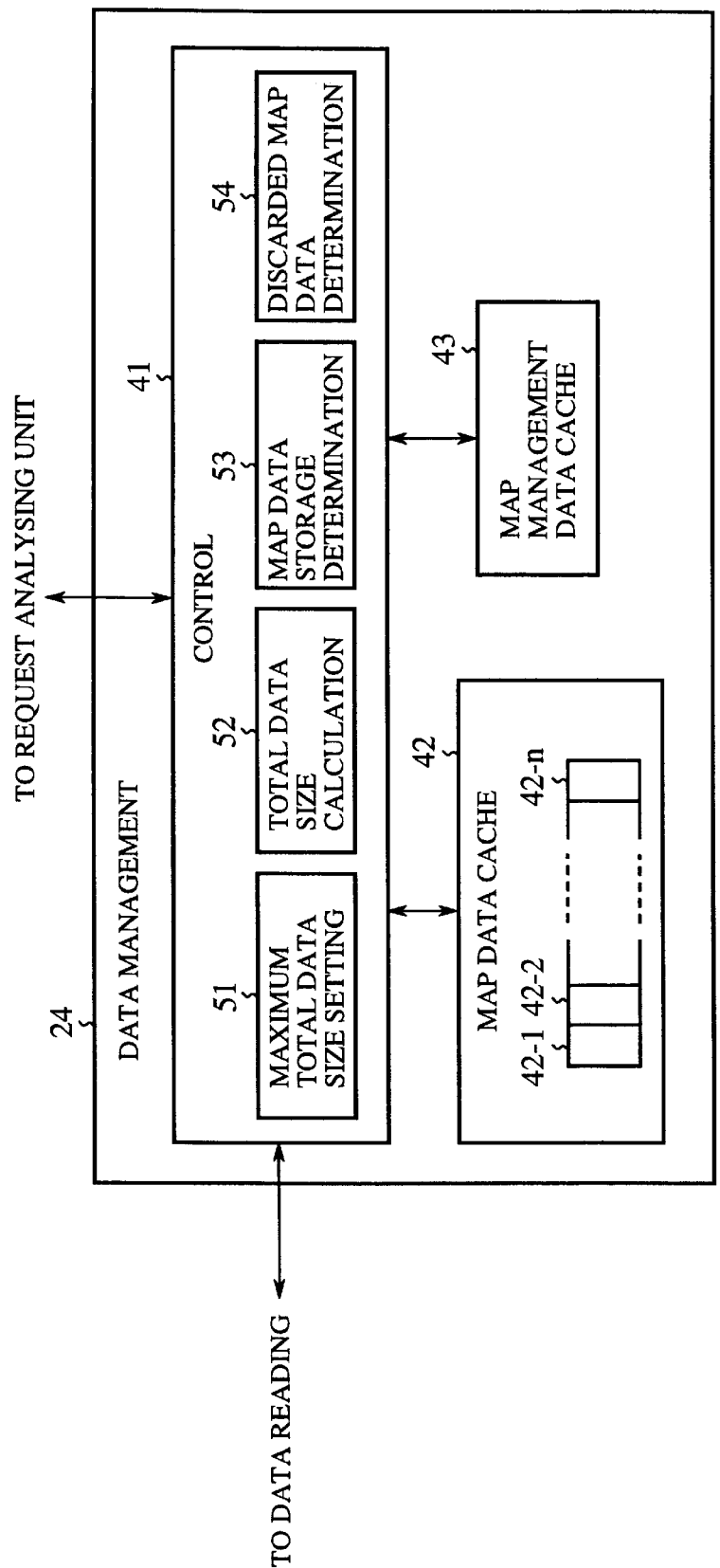
FIG. 6 is a block diagram showing a construction of a data management unit in an on-vehicle information processor according to a second embodiment of the present invention.

FIG. 6 is a block diagram showing a construction of a data management unit in an on-vehicle information processor according to a second embodiment of the present invention. Referring to FIG. 6, the data management unit comprises: a maximum total data size setting unit 51 for setting an upper limit size defined as a maximum size of map data stored in the map data cache 42; a total data size calculating unit 52 for calculating a total size of map data stored in the map data cache 42; a map data storage determination unit 53 for determining whether a new map data item is to be stored in the map data cache 42; and a discarded map data determination unit 54 for determining the map data item that should be discarded so as to release the corresponding map data storage area in the map data cache 42.

The other components of the on-vehicle information processor according to the second embodiment are identical to the corresponding components of the first embodiment so that the description thereof is omitted.

A description will now be given of the operation according to the second embodiment.

Figure 7:
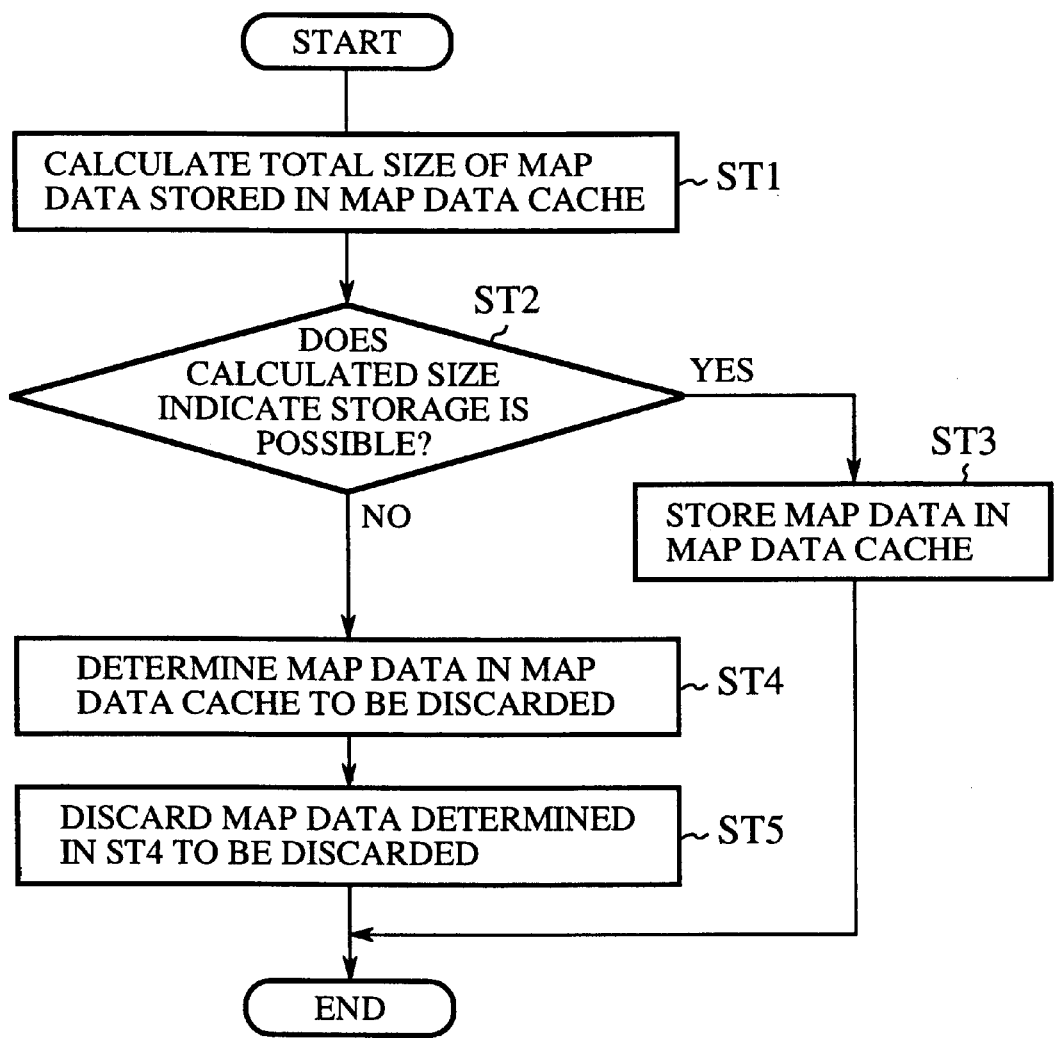
FIG. 7 is a flowchart illustrating an operation of a data management unit in the on-vehicle information processor according to the second embodiment.

FIG. 7 is a flowchart showing the operation of the data management unit 24 of the on-vehicle information processor according to the second embodiment.

In step ST1, the total data size calculating unit 52 of the control unit 41 calculates a total size of map data stored in the map data cache 42 before storing the map data 31 read out by the data reading unit 23 in the map data cache 42. In step ST2, the map data storage determination unit 53 determines whether a sum of the total size of stored map data and the size of map data read out is below the upper limit size set by the maximum total data size setting unit 51.

When it is determined that the sum of the total size of stored map data and the size of the map data read out is below the upper limit, the map data read out is stored in step ST3 in the map data storage area 42-i in the map data cache 42.

When it is determined that the sum of the total size of stored map data and the size of the map data read out exceeds the upper limit, the discarded map data determination unit 54 determines in step ST4 the map data to be discarded. In step ST5, the map data thus determined to be discarded is discarded so that the map data read out is stored in its place.

The operation described above is repeated whenever the map data is read out by the map reading unit 23.

The discarded map data determination unit 54 may also be employed when the map data cache stores the n map data items, to determine the map data to be discarded. The map data thus determined to be discarded is discarded so that the map data read out is stored in place of the discarded data.

The other aspects of the operation according to the second embodiment are the same as the corresponding aspects according to the first embodiment so that the description thereof is omitted.

As described, according to the second embodiment, the total size of map data stored in the map data cache 42 is controlled to be smaller the predetermined upper limit. Accordingly, the memory size used in the map data cache 42 is known so that the memory management is easy.

Third Embodiment

Figure 8:
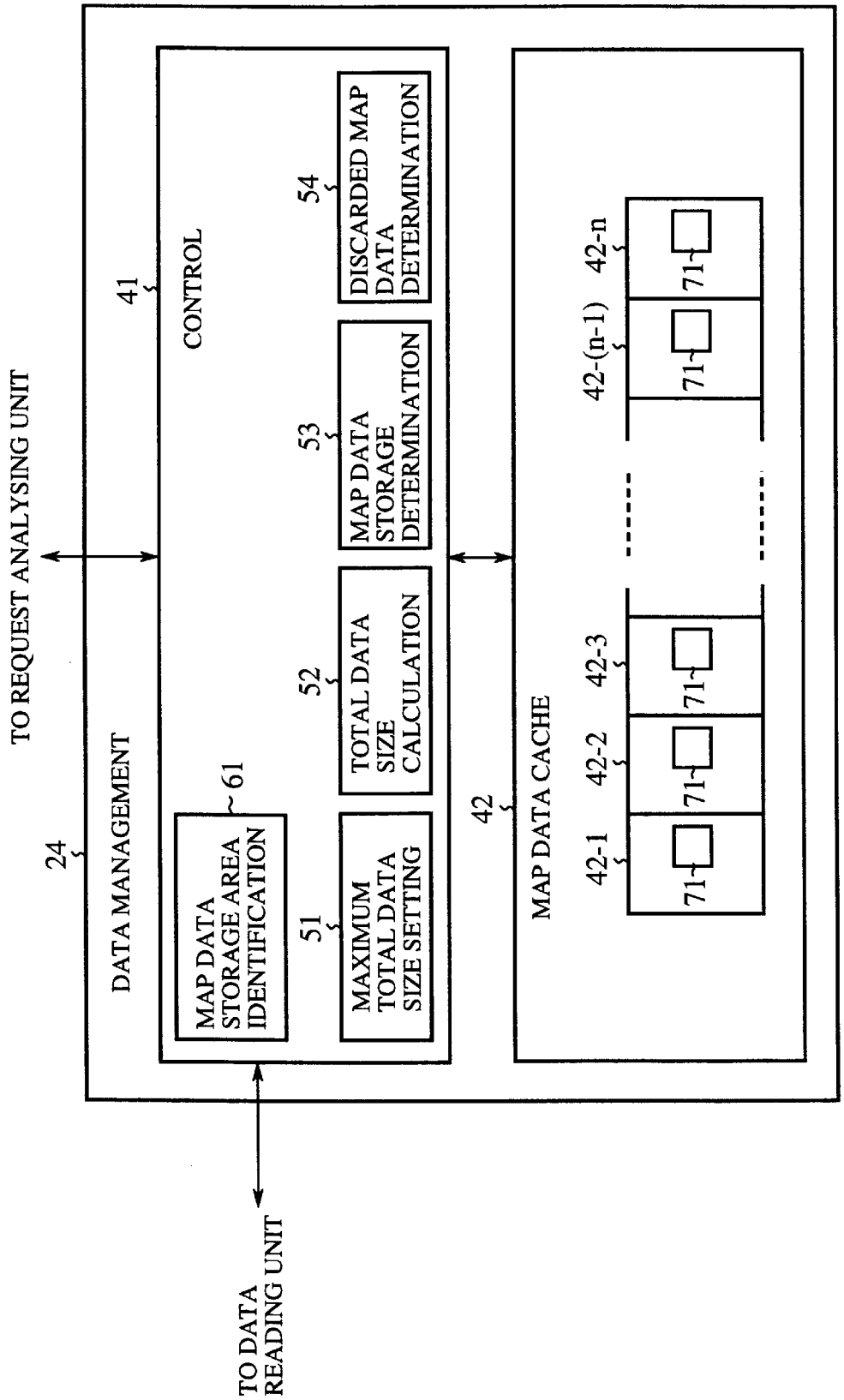
FIG. 8 is a block diagram showing a construction of a data management unit in an on-vehicle information processor according to a third embodiment of the present invention.

FIG. 8 is a block diagram showing a construction of a data management unit in an on-vehicle information processor according to a third embodiment of the present invention. Referring to FIG. 8, the data management unit 24 comprises a map data storage area identification unit 61 provided in the control unit 41. Reference numeral 71 indicates a number of applications accessing a map data item stored in the map data storage area 42-i. The map storage area identification unit 61 refers to the number 71 before discarding map data stored in the map data cache 42, so as to select the map data storage area 42-i in which the number 71 is zero.

The other components of the on-vehicle information processor according to the third embodiment are identical to the corresponding components of the second embodiment so that the description thereof is omitted.

A description will now be given of the operation according to the third embodiment.

When a map data item stored in the map data cache 42 is discarded in the third embodiment, the map data storage area identification unit 61 of the control unit 41 refers to the number 71 of accessing applications so as to select the map data item not accessed by any of the applications 12–14. The selected data item is discarded by the discarded map data determination unit 54. A replacing map data item is stored in the map data storage area 42-i in which the map data item is discarded. The number 71 of accessing applications is updated whenever the status of accesses from the applications changes.

The other aspects of the operation according to the third embodiment are identical to the corresponding aspects of the second embodiment so that the description thereof is omitted.

As described, according to the third embodiment, the number 71 of accessing applications is referred to so as to select the map data item not accessed by the applications before discarding the map data stored in the map data cache 42. With this, the map data is being accessed prevented from being discarded without locking the map data while the application is accessing the map data.

Fourth Embodiment

Figure 9:
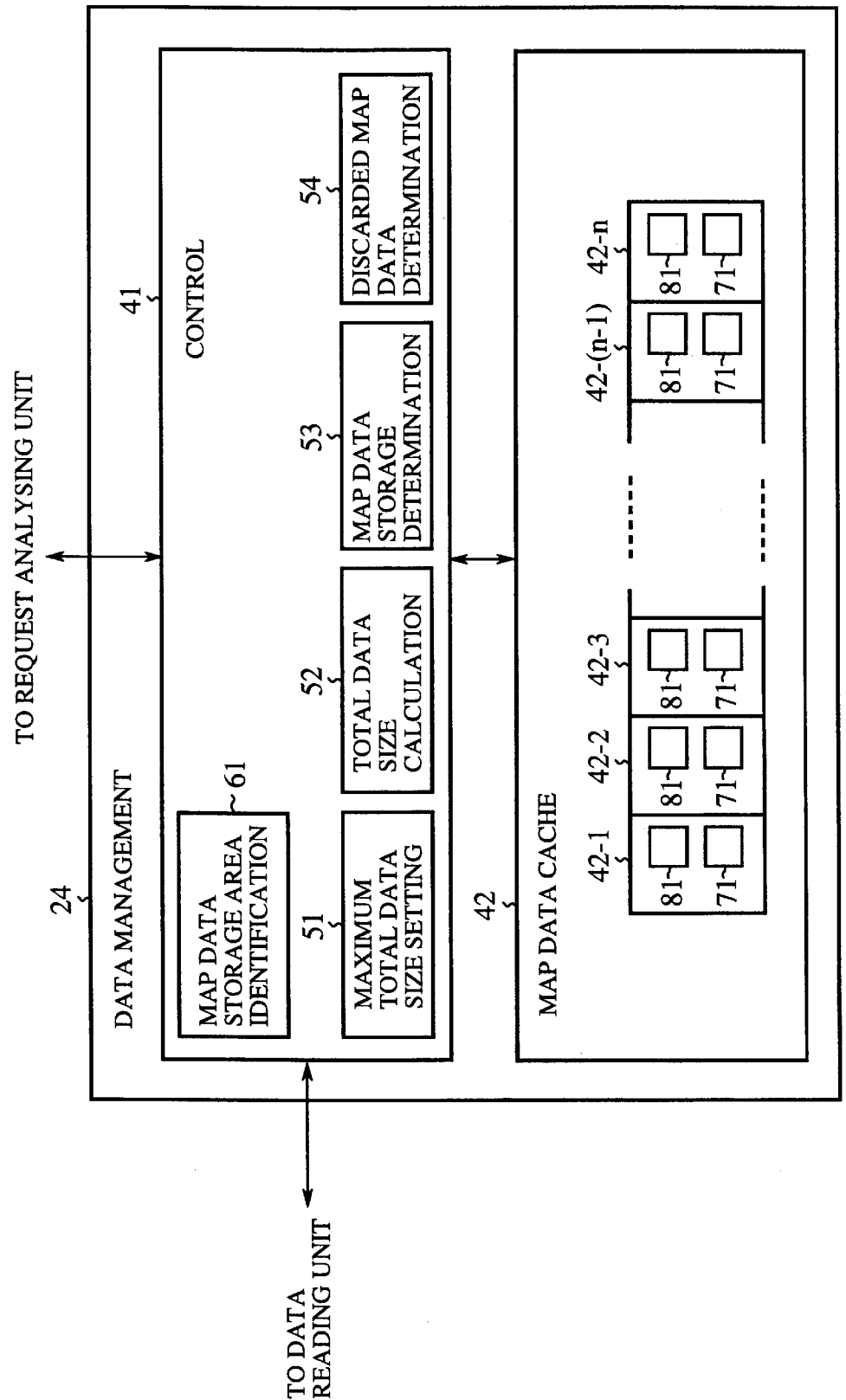
FIG. 9 is a block diagram showing a construction of a data management unit in an on-vehicle information processor according to a fourth embodiment of the present invention.
Figure 10:
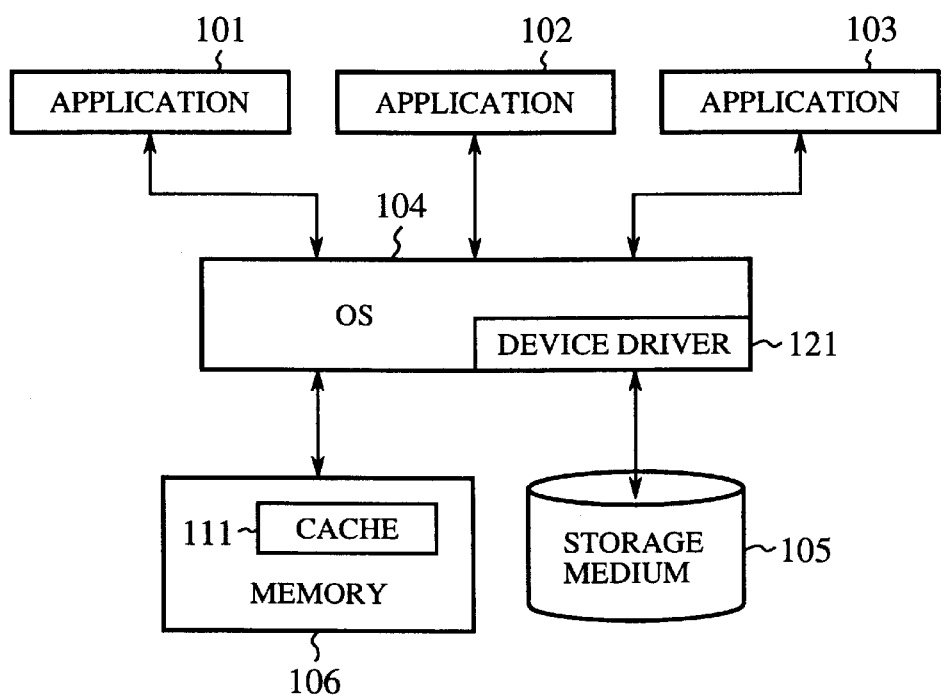
FIG. 10 is a block diagram showing a construction of an on-vehicle information processor according to the related art.
Figure 11:
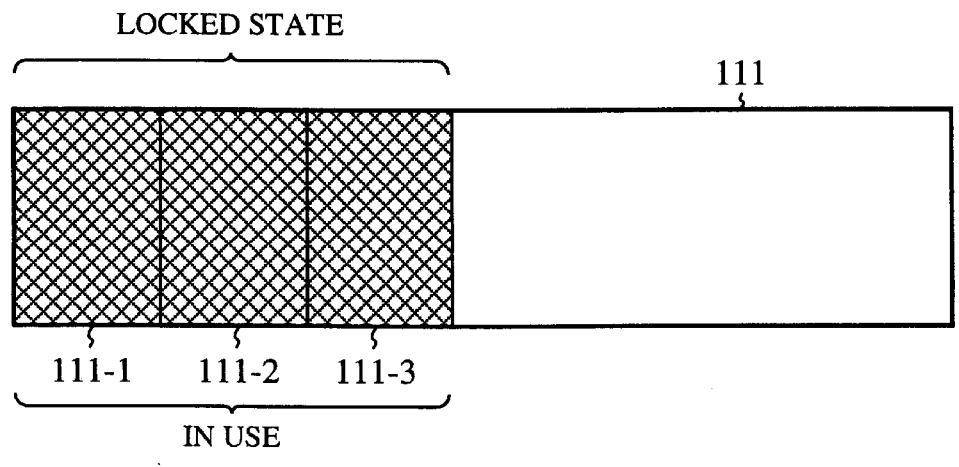
FIG. 11 is an example of how a cache is used in the on-vehicle information processor according to the related art.

FIG. 9 is a block diagram showing a construction of the data management unit in an on-vehicle information processor according to a fourth embodiment of the present invention. Referring to FIG. 9, reference numeral 81 indicates a chronological sequence data containing information relating to a sequence of storage of map data or time when an access to map data occurs. The other components of the on-vehicle information processor according to the fourth embodiment are identical to the corresponding components of the third embodiment so that the description thereof is omitted.

A description will now be given of the operation according to the fourth embodiment.

The map data storage area identification unit 61 refers to the chronological sequence data 81 for each of the map data items, so as to determine the map data item in the map data cache 42 to be discarded based on the chronological sequence information. The map data item associated with the oldest access time or the map data associated with the oldest storage time may be selected.

The other aspects of the fourth embodiment are identical to the corresponding aspects according to the third embodiment so that the description thereof is omitted.

As described, according to the fourth embodiment, the chronological sequence data 81 is referred to before discarding the map data stored in the map data cache 42. Accordingly, the map data that is relatively less likely to be accessed in the near future by any of the applications 12–14 can be discarded. With this, the frequency of accesses to the map data in the recording medium 4 is reduced so that the efficiency in processing is improved.

The present invention is not limited to the above-described embodiments, and variations and modifications may be made without departing from the scope of the present invention.

What is claimed is:

1. An on-vehicle information processor for providing map information based on map data, comprising:

application processing means for providing map information based on map data and map management data;

a data reading unit for reading the map data and the map management data from a recording medium;

a data management unit for managing the map data and the map management data independently; and a request analyzing unit for responding to a request from said application processing means to permit access from said application processing means to the map data and the map management data managed by said data management unit.

2. The on-vehicle information processor according to claim 1, wherein:

said data management unit acquires the map management data provided to said application means, so as to manage the map management data acquired;

said request analyzing unit reads the map management data from the recording medium via said data reading unit so as to supply the map management data thus read to said application means, when the map management data is required by said application means; and said request analyzing unit supplies the map management data managed by said data management unit to said application means when the map management data is subsequently required by said application means.

3. The on-vehicle information processor according to claim 1, wherein said data management unit includes a map data cache and a control unit for controlling the map data cache.

4. The on-vehicle information processor according to claim 3, wherein the control unit in said data management unit controls the map data stored in said map data cache to be smaller in size than an upper limit.

5. The on-vehicle information processor according to claim 3, wherein said request analyzing unit grants access from a plurality of application means to the same map data stored in the map data cache.

6. The on-vehicle information processor according to claim 3, wherein:

the map data cache stores count information indicating number of application means accessing a storage area storing the map data, and the control unit determines whether the map data stored in the map data cache that should be discarded, based on the count information stored in the map data cache.

7. The on-vehicle information processor according to claim 6, wherein:

the map data cache stores information relating to one of chronological sequence of storage of the map data and information indicating time of access to the map data, and the control unit determines the map data stored in the map data cache that should be discarded, based on the information stored in the map data cache.

* * * * *